United States Patent [19]
Wai et al.

[11] Patent Number: 5,356,538
[45] Date of Patent: Oct. 18, 1994

[54] SUPERCRITICAL FLUID EXTRACTION

[75] Inventors: Chien M. Wai, Moscow, Id.; Kenneth Laintz, Pullman, Wash.

[73] Assignee: Idaho Research Foundation, Inc., Moscow, Id.

[21] Appl. No.: 781,086

[22] Filed: Oct. 21, 1991

Related U.S. Application Data

[63] Continuation-in-part of Ser. No. 714,265, Jun. 12, 1991, Pat. No. 5,274,129.

[51] Int. Cl.$^5$ ............................................. B01D 11/04
[52] U.S. Cl. .................................. 210/634; 210/511
[58] Field of Search .................... 210/634, 638, 511; 423/22, 24; 554/143; 208/221, 251 R; 585/511

[56] References Cited

U.S. PATENT DOCUMENTS

| | | | |
|---|---|---|---|
| 4,069,273 | 1/1978 | Komoto | 585/511 |
| 4,206,132 | 6/1980 | Sievers | 260/429.2 |
| 4,464,251 | 8/1984 | Kukes et al. | 208/251 R X |
| 4,845,905 | 1/1990 | Schneider et al. | 423/22 X |
| 5,169,968 | 12/1992 | Rice | 554/193 |

Primary Examiner—Frank Spear
Attorney, Agent, or Firm—Klarquist, Sparkman, Campbell, Leigh & Whinston

[57] ABSTRACT

A method of extracting metalloid and metal species from a solid or liquid material by exposing the material to a supercritical fluid solvent containing a chelating agent. The chelating agent forms chelates that are soluble in the supercritical fluid to allow removal of the species from the material. In preferred embodiments, the extraction solvent is supercritical carbon dioxide and the chelating agent is a fluorinated or lipophilic crown ether or fluorinated dithiocarbamate. The method provides an environmentally benign process for removing contaminants from industrial waste without using acids or biologically harmful solvents. The chelate and supercritical fluid can be regenerated, and the contaminant species recovered, to provide an economic, efficient process.

32 Claims, 6 Drawing Sheets

SUPERCRITICAL FLUID EXTRACTION

ACKNOWLEDGEMENT OF GOVERNMENT SUPPORT

This invention was funded in part by the United States Department of Energy, under Special Master Task research Subcontract No. C85-110554, and the National Science Foundation, under Grant RII-8902065. The United States Government may have certain rights in this invention.

CROSS REFERENCE TO RELATED APPLICATION

This application is a continuation-in-part of co-pending U.S. Pat. application Ser. No. 07/714,265, filed Jun. 12, 1991, now U.S. Pat. No. 5,274,129, which is incorporated by reference.

BACKGROUND OF THE INVENTION

1. Field of the Invention

This invention concerns extraction of metalloids and metals from solids and liquids, and is more particularly directed to a waste treatment process in which metals such as lanthanides and actinides are efficiently extracted from waste material.

2. General Discussion of the Background

Waste treatment and disposal is an important social and economic issue. Industries throughout the world spend large sums of money to reduce the biological hazards of environmental exposure to toxic substances. One particular environmental problem is the removal of toxic metals and radioisotopes from solid or liquid industrial wastes. Such contaminants can be removed from soils, for example, by treating the soil with an acid that dissolves the metals. Acid dissolution is followed by selective precipitation, electrowinning, or solvent extraction. Acid dissolution is unfortunately very non-specific, and often produces many by-products that can create serious environmental problems in their own right.

An alternative detoxification process is to encapsulate contaminants in a container or insoluble matrix that prevents their entry into the environment. This approach still requires storage of the bulky matrix, and does not allow regeneration or reuse of the contaminants. Hence there is a need for a biologically compatible waste treatment process that efficiently and effectively separates metals from contaminated materials. There is also a need for such a process that is biologically compatible and permits selective regeneration and reuse of the contaminants.

One of the present inventors has previously disclosed that enhanced extraction of metals can be achieved with ionizable crown ethers, such as crown ether carboxylic acids. The inventors have found that these macrocyclic ethers have cavities that can selectively extract lanthanides and actinides by attracting these species with an ionized side chain. The metal ion is then inserted into the cavity of the macrocycle to form a chelate. Analyst, 114:451-453 (1989) and Anal. Chem 58:3233-3235 (1986). This mechanism of attracting the ion and inserting it in the ring has earned these compounds the name of "lariat crown ethers." In these reports, a crown ether carboxylic acid (sym-dibenzo-16-crown-5-oxyacetic acid) was used to extract lanthanides from aqueous solutions into an organic phase with high efficiency and selectivity. U.S. Pat. No. 4,908,135 similarly discloses separation of secondary and tertiary amines using a different crown ether, while U.S. Pat. No. 4,942,149 shows separation of racemic compounds with yet other crown ethers.

An unrelated solvent extraction method is supercritical fluid extraction. A supercritical fluid is typically one that is gaseous at ambient conditions, but which is maintained at a temperature and pressure above its critical temperature and pressure. Under those conditions it forms a solvent that can be used to extract organic materials such as caffeine from coffee beans. U.S. Pat. No. 4,911,941 provides an example of supercritical carbon dioxide extraction of caffeine in which green coffee beans are moved periodically through an extraction vessel and contacted with continuously flowing supercritical carbon dioxide. U.S. Pat. No. 4,898,673 shows a similar system in which soluble materials are continuously extracted from solids using supercritical carbon dioxide. The soluble solids are circulated in a closed loop pipeline with the supercritical fluid.

Supercritical extraction of environmental wastes has not previously been suggested. This may be due to the relatively low solubility of metals and other non-organic materials in supercritical fluids. Direct extraction of metal ions by supercritical carbon dioxide, for example, is inefficient because of the weak van der Waals interaction between metal ions and carbon dioxide. This weak interaction has apparently discouraged efforts to perform supercritical fluid extraction of metals from environmental wastes.

It is accordingly an object of this invention to provide an improved method for extracting metals from liquids or solids, including complex matrices.

It is another object of the invention to provide such an improved method that allows efficient and biologically compatible extraction of metals from the environment.

Yet another object is to provide such an improved method that allows selectivity as to the type of metal extracted by the system.

Even yet another object is to provide such an improved method that can selectively extract lanthanides and actinides.

Finally, it is an object of this invention to provide such an improved method that is efficient and economical compared to many other extraction processes.

These and other objects of the invention will be understood more clearly by reference to the following drawings and detailed description.

SUMMARY OF THE INVENTION

The foregoing objects are achieved by a method of extracting a metal species (including lanthanides and actinides) from a solid or liquid by exposing the solid or liquid to a supercritical fluid solvent that contains a chelating agent. The supercritical fluid and chelating agent are exposed to the solid or liquid for a sufficient period of time to form a chelate between the metal and chelating agent that is soluble in the supercritical fluid. The supercritical fluid is then removed from the solid or liquid with the solubilized metal chelate dissolved in the supercritical fluid. The metal chelates can subsequently be precipitated from the supercritical fluid, for example by reducing the pressure on the supercritical fluid. The chelating agent can also be regenerated for reuse. The resulting process is an efficient, cost effective method for removing metals from the environment without using environmentally harmful extraction solvents.

The chelating agents can be any agent that forms a chelate with the metal being extracted, wherein the chelate is soluble in the supercritical fluid solvent. Examples of suitable chelating agents include dithiocarbamates and ionizable crown ethers such as diethyldithiocarbamate (DDC)

or

These agents are negatively charged species that are soluble in a carbon dioxide solvent. In especially preferred embodiments, the chelating agent is fluorinated to enhance solubility of the metal chelate in supercritical carbon dioxide. Examples of fluorinated chelating agents are:

bis(tri-fluoroethyl)dithiocarbamate (FDDC)

or

It has been found that the solubilities of some fluorinated metal chelates in supercritical carbon dioxide are enhanced by two to three orders of magnitude relative to the corresponding non-fluorinated metal chelates. For instance, the solubility of Cu(FDDC)$_2$ in supercritical carbon dioxide is about $1 \times 10^{-3}$ moles per liter at 50° C. and 100 atmospheres, whereas the solubility of Cu(DDC)$_2$ is less than $1 \times 10^{-6}$ moles per liter under the same conditions. Fluorinated chelating agents have been found to greatly enhance the efficiency of metal extraction in supercritical carbon dioxide.

In yet other embodiments of the invention, a modifier is added to the supercritical fluid to further enhance the efficiency of the extraction method by increasing the solubility of the metal chelate in the supercritical fluid. Carbon dioxide, for example, is a relatively non-polar solvent. Its polarity can be increased by adding a more polar solvent to the supercritical carbon dioxide. Disclosed examples of more polar solvents are a low to medium boiling point alcohol or ester, such as methanol. The alcohol or ester increases the polarity of the supercritical fluid, enhances the solubility of the metal chelate in the fluid, and further improves the extraction efficiency of the method.

The present method can also be used selectively to remove particular contaminants from liquid or solid waste. Ionizable crown ethers of a given ionic diameter can, for example, selectively remove lanthanides and actinides from the waste material. Suitable crown ethers include dibenzo crown ether derivatives of a hydroxamic acid represented by the formula:

(X)

wherein X is a dibenzo crown ether of the formula dibenzo [13+3m]-crown-[4+m]ether, and m is an integer of from 0 to about 5; n is an integer from 0 to 6; and R$_1$ is H or a lipophilic hydrocarbyl group having from 1 to about 18 carbon atoms that is selected from the group consisting of alkyl, cycloalkyl, alkenyl and aryl groups. In more preferred embodiments, the ionizable crown ether has the chemical formula wherein X is OH or NHOH; R$_2$ is alkyl, fluorinated alkyl, phenyl or fluorinated phenyl; R$_3$ is alkyl, fluorinated alkyl, phenyl or fluorinated phenyl; R$_4$ is H or F; R$_5$ is H or F; and n is 1 to 3. When n is 1, the chelating agent is In yet other embodiments, the chelating agent is a dithiocarbamate having the general formula wherein $R_6$ and $R_7$ are independently alkyl or aromatic groups that may contain one or more fluorine atoms. When $R_6=R_7=CH_3CH_2$, the ligand is called diethyldithiocarbamate (DDC), and it forms a metal chelate such as where M is a metal.

In particularly preferred embodiments, $R_6$ and $R_7$ are both $CF_3CH_2$, the ligand is called bis(trifluoroethyl)dithiocarbamate, and the resulting metal chelate has a structure such as where M is a metal.

In more particular embodiments of the invention, a system is provided for treating waste material containing metal species. The material is placed in a container through which the supercritical fluid is passed to solubilize the metal species. Supercritical fluid and solubilized metal species are removed from the container to separate the metal species from the waste material. In preferred embodiments, a chelating agent is dissolved in the supercritical fluid to form chelates with the metal species that are soluble in the fluid. In especially preferred embodiments, the chelates are fluorinated to further increase their solubility and enhance the extraction efficiency of the separation method. Polar solvents such as alcohols or esters can be added to the supercritical fluid to also enhance solubility of the metal chelate in the supercritical fluid.

Supercritical fluid can be flowed continuously through the waste material, or exposed to the material in a discontinuous batch process. In one embodiment, the supercritical fluid is flowed through a chelating agent before the waste material is exposed to the fluid to dissolve the chelating agent in the fluid. After the metal chelates have formed and dissolved in the supercritical fluid, the pressure on the supercritical fluid can be reduced to below supercritical levels such that the fluid becomes a gas and the metal chelates are precipitated from the system. The pure metal can then be collected, and the chelating agent recycled to further extract the waste material. The chelating agent can be separated from the metal, for example, by 0.1M or more concentrated nitric acid with a pH less than or equal to 1.

DETAILED DESCRIPTION OF SEVERAL PREFERRED EMBODIMENTS

The present invention is a method of extracting metalloids or metals from solid or liquid materials by exposing the material to a supercritical fluid which preferably contains a chelating agent that forms a metal chelate with the extracted metal. The chelate is soluble in the supercritical fluid, which allows efficient extraction of the chelate from the material. The present invention is suitable for removing many different types of metalloids or metals from liquids or solids. Metalloids are elements with both metallic and non-metallic properties, and include arsenic, selenium and tellurium. A metal is an element that forms positive ions in solutions, and produces oxides that form hydroxides rather than acids with water. Metals include alkali metals, alkali-earth metals, transition metals, noble metals (including the precious metals gold, platinum and silver), rare metals, rare-earth metals (lanthanides), actinides (including the transuranic metals), light metals, and heavy metals. Specific examples are given herein of extraction methods for removing lanthanides and actinides (collectively referred to as the f-group elements from the filling of their 4f and 5f orbitals) as well as transition metals such as copper. The f group elements are commonly produced by nuclear fission reactions, and the actinides are radioactive. Transition metals are commonly used or produced in many industrial processes and products, such as mineral production or fly ash.

Suitable supercritical fluids for use in the present invention include carbon dioxide, nitrogen, nitrous oxide, methane, ethylene, propane and propylene. Carbon dioxide, having a critical temperature of 31° C. and a critical pressure of 72.8 atmospheres, is particularly preferred. Carbon dioxide is abundantly available, relatively inexpensive, non-explosive and thoroughly safe for use in waste treatment. The supercritical fluids may be used either individually or in combinations, as mixed supercritical solvents. Examples of other supercritical fluids, and their critical temperature and pressure, are shown in the following Table I:

TABLE I

| PHYSICAL PARAMETERS OF SELECTED SUPERCRITICAL FLUIDS* | | | | | |
|---|---|---|---|---|---|
| Fluid | Molecular Formula | $T_c$(°C.) | $p_c$(atm) | $p_c$(g/mL) | $p400_{atm}$** |
| Carbon dioxide | $CO_2$ | 31.1 | 72.9 | 0.47 | 0.96 |
| Nitrous oxide | $N_2O$ | 36.5 | 71.7 | 0.45 | 0.94 |
| Ammonia | $NH_3$ | 132.5 | 112.5 | 0.24 | 0.40 |

TABLE I-continued
PHYSICAL PARAMETERS OF SELECTED SUPERCRITICAL FLUIDS*

| Fluid | Molecular Formula | $T_c$(°C.) | $p_c$(atm) | $\rho_c$(g/mL) | $\rho 400_{atm}$** |
|---|---|---|---|---|---|
| $\eta$-Pentane | $C_5H_{12}$ | 196.6 | 33.3 | 0.23 | 0.51 |
| $\eta$-Butane | $C_4H_{10}$ | 152.0 | 37.5 | 0.23 | 0.50 |
| $\eta$-Propane | $C_3H_6$ | 96.8 | 42.0 | 0.22 | — |
| Sulfur hexafluoride | $SF_6$ | 45.5 | 37.1 | 0.74 | 1.61 |
| Xenon | Xe | 16.6 | 58.4 | 1.10 | 2.30 |
| Dichlorodifluoromethane | $CCl_2F_2$ | 111.8 | 40.7 | 0.56 | 1.12 |
| Trifluoromethane | $CHF_3$ | 25.9 | 46.9 | 0.52 | — |
| Methanol | $CH_3OH$ | 240.5 | 78.9 | 0.27 | — |
| Ethanol | $C_2H_5OH$ | 243.4 | 63.0 | 0.28 | — |
| Isopropanol | $C_3H_7OH$ | 235.3 | 47.0 | 0.27 | — |
| Diethyl ether | $(C_2H_{25})_2O$ | 193.6 | 36.3 | 0.27 | — |
| Water | $H_2O$ | 374.1 | 218.3 | | |

*data from Matheson Gas Data Book (1980) and CRC Handbook of Chemistry and Physics (CRC Press, Boca Raton, Florida 1984).
**$T_r = 1.03$ In addition, a modifier may be added to the supercritical fluid to improve the solvent characteristics of the supercritical fluid. The most useful modifiers are the low to medium boiling point alcohols and esters. Typical modifiers include methanol, ethanol, ethyl acetate and the like. The modifiers may be added to the supercritical fluids at proportions of between about 0.1% and 20.0% by weight. The modifiers contemplated for use herein are most typically not supercritical fluids at the disclosed operating conditions but rather, the modifiers are simply dissolved in the supercritical fluid, improving its solvent properties.

In one embodiment the chosen enhancer is combined with the supercritical fluid at the described proportions prior to feeding the supercritical fluid to the extraction vessel. Alternatively, the supercritical fluid is fed to the extraction vessel without the enhancer. The enhancer is then introduced into the extraction vessel and thereby combined with the supercritical fluid.

Some chelating agents that may be useful for solubilizing metals in supercritical fluids include:

TABLE II
Commonly used Metal Chelating Reagents

O-Donating Chelating Regaents
  Cupferron
  Chloranillic acid and related reagents
  $\beta$-Dikentones and related reagents
  N-Benzoyl-N-phenylhydroxylamine and related reagents
  Macrocyclic compounds
N-Donating Chelating Reagents
  $\alpha$-Dioximines
  Diaminobenzidine and related reagents
  Porphyrines and related reagents
O,N-Donating chelating Reagents
  8-Hydroxyquinoline and related reagents
  Nitrosonaphthols and nitrosophenols
  EDTA and other complexionates
  Diphenylcarbazide and diphenylcarbazone
  Azoazoxy BN
S-Donating Chelating Reagents
  Sodium Diethyldithiocarbamate and related reagents
  Dithizone and related reagents
  Bismuthiol II
  Thiothenoyltrifluoroacetone
  Thioxine
P-Donating Chelating Reagents
  Tributylphosphate and related reagents The following examples illustrate several specific embodiments of the method.

EXAMPLE I

Figure 1:
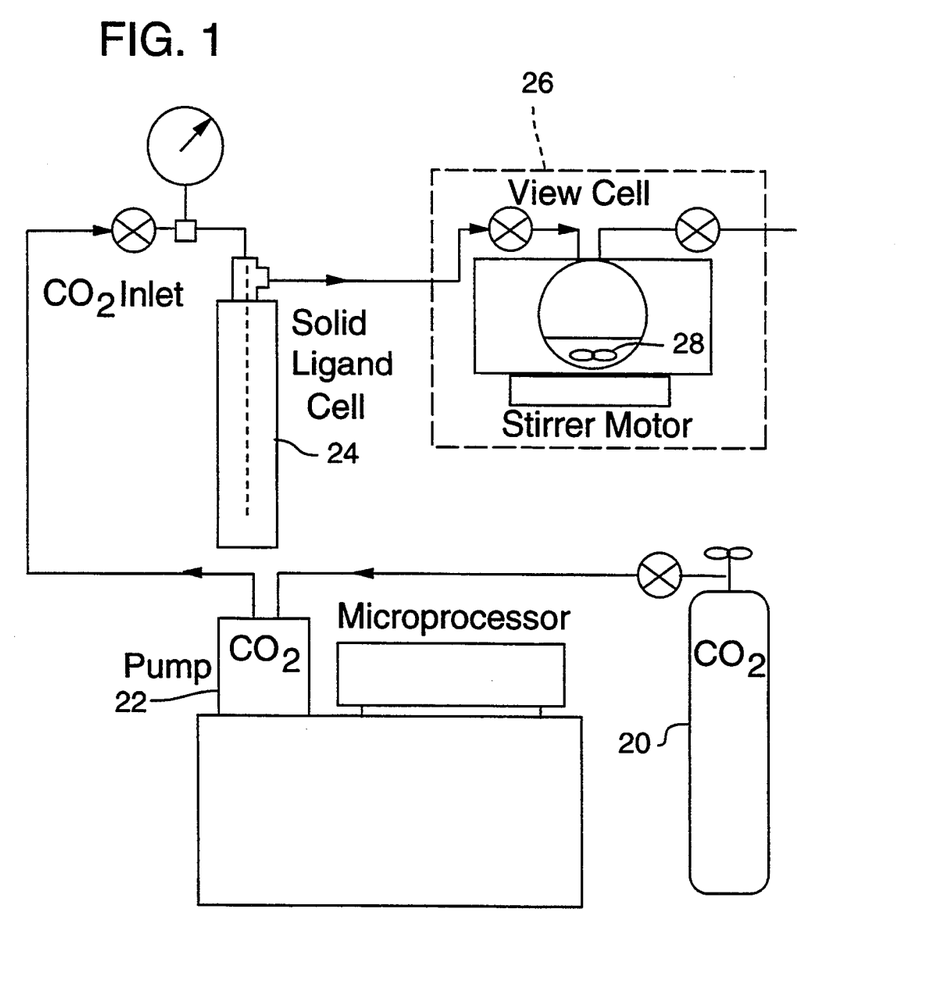
FIG. 1 is a schematic view of a system for using supercritical fluid to extract $Cu^{2+}$ from an aqueous solution.

Bulk and Continuous Extraction (FIG. 1)

A sample bulk extraction device is shown in FIG. 1 to include a source 20 of supercritical $CO_2$ that directly extracts Cu from aqueous solution. The supercritical $CO_2$ was delivered from a high pressure syringe pump 22 and passed through solid lithium bis(trifluoroethyl)-dithiocarbamate (FDDC) which was contained in a stainless steel, high pressure extraction vessel 24. The supercritical $CO_2$ containing dissolved FDDC was subsequently introduced to a second extraction vessel 26 fitted with quartz windows and containing an aqueous solution 28 of $Cu(NO_3)_2$ below a SCF $CO_2$ phase. Extraction of Cu was monitored by UV-Visible spectroscopy as the formation of the $CO_2$ soluble complex $Cu(FDDC)_2$, the structure of which is shown below.

Figure 2:
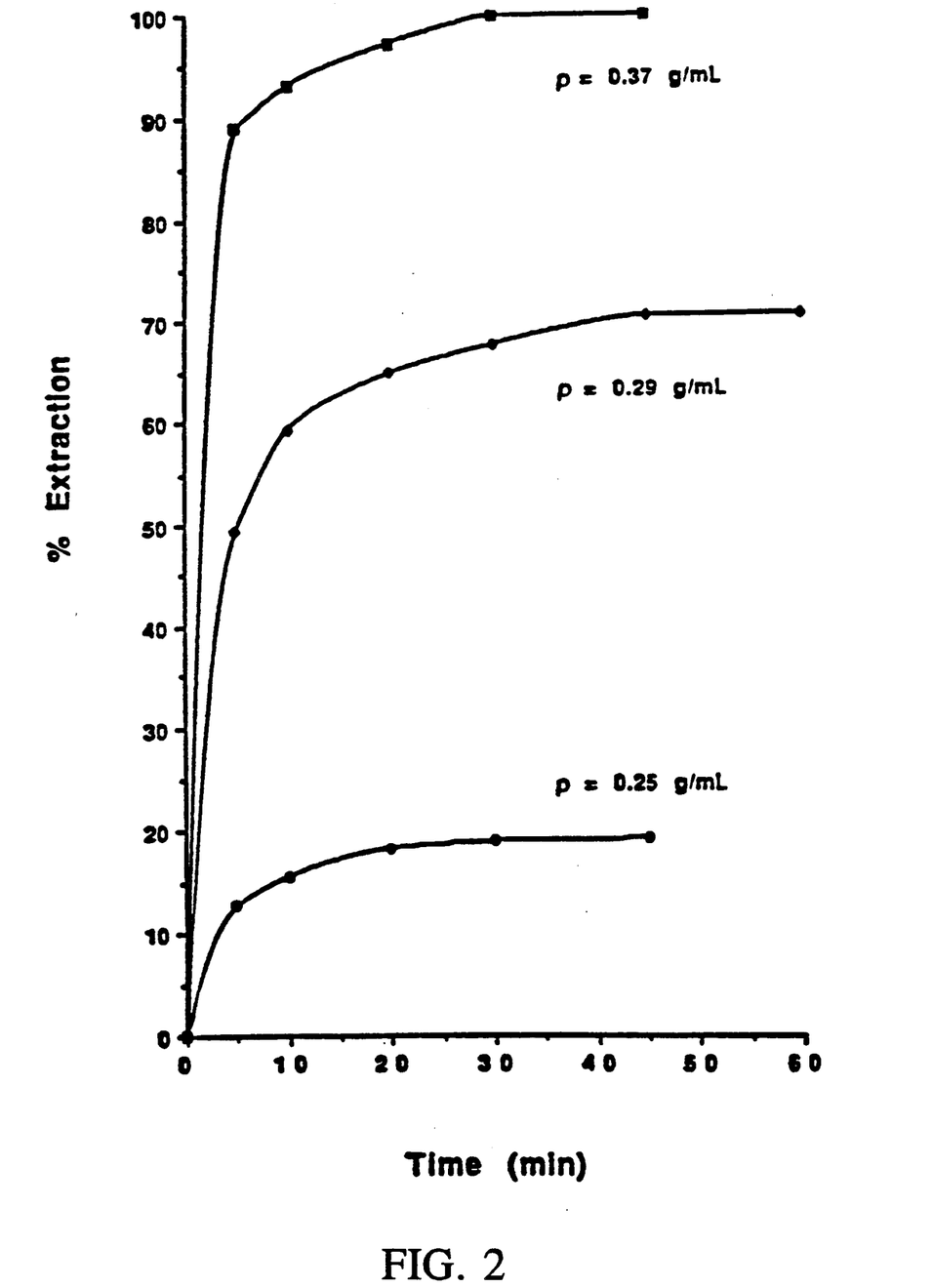
FIG. 2 is a graph illustrating the rate of extraction of $Cu^{2+}$ from water using supercritical $CO_2$ with varying densities at 35° C. saturated with bis(trifluoroethyl)dithiocarbamate (FDDC).

For the bulk extraction system of FIG. 1 where mixing of the aqueous and supercritical fluid phases were carried out by simple stirring, extraction efficiency was found to be pressure dependent. As seen from FIG. 2, the initial extraction rate is very rapid. Within about 5 minutes, approximately 70% of the complex saturation value at the given fluid density was achieved. Finally, quantitative extraction of the copper ions had been achieved in about 30 minutes with a pressure of 79.3 bar and a temperature of 35° C. At 50° C., quantitative extraction occurred at a $CO_2$ density of 0.29 g/cm³ in less than 5 minutes, thus indicating an appropriate rate increase from 35° C.

A continuous extraction process was set up using the apparatus of FIG. 1 in which a high pressure recirculating pump was installed in line with the extraction system. Quantitative extraction occurred even more rapidly than in the bulk system with quantitative extraction occurring in less than 5 minutes at 35° C.

The above results demonstrate that quantitative extraction of metal ions from an aqueous or liquid matrix is possible with both bulk and continuous reactor systems using a dissolved molecular complexionate in the supercritical fluid phase.

EXAMPLE II

Extraction From a Solid Matrix

The same apparatus used in Example I was also used in the extraction of Cu ions adsorbed on a solid matrix. In this case, solid $Cu(NO_3)_2$ adsorbed on silica $(SiO_2)$ was placed in the second extraction vessel. Supercritical $CO_2$ containing dissolved ligand, FDDC, was then introduced into the cell. Extraction efficiency was again monitored spectroscopically as $Cu(FDDC)_2$ dissolved into the supercritical $CO_2$. Initial extraction rates were again very rapid. In about 20 minutes the $CO_2$ phase was saturated with dissolved metal complex. In this case approximately 80% of the Cu ions could be extracted at a final fluid density of 0.55 g/cm³.

In both Examples I and II, it was found that the metal chelate could be collected in whole by precipitation from the supercritical $CO_2$ by decreasing the pressure of the system. It is also seen that the present invention is useful for removing contaminants from a complex matrix, which is either a solution or solid sample in which are present many different species (including organic and inorganic species).

EXAMPLE III

Fluorinated Chelating Agents

In developing the above extraction methods, it was found that fluorination of complexing agents yielded enhanced solubility behaviors of the metal chelates in supercritical $CO_2$. Fluorination of sodium diethyldithiocarbamate (DDC) to form sodium or lithium bis(trifluoroethyl)dithiocarbamate (FDDC) was found to increase the solubilities of the metaldiethyldithiocarbamates by almost 3 orders of magnitude. For example, $Cu(DDC)_2$ has a UV-Visible determined solubility in supercritical $CO_2$ of $(1.1 \pm 0.2) \times 10^{-6}$ mol/L. Upon the fluorination of the terminal methyl groups of DDC, the solubility of $Cu(FDDC)_2$ in supercritical $CO_2$ was determined to be $(9.1 \pm 0.3) \times 10^{-4}$ mol/L. Another example of increased solubility in supercritical $CO_2$ was obtained with the β-diketone acetylyacetonate (acac). The solubility of $Cu(acac)_2$ in supercritical $CO_2$ was substantially increased by forming $Cu(hfacac)_2$, which is the hexafluoroacetyl acetonate.

The present inventors have found that fluorination of chelating agents favors the extraction of fluorinated metal chelates in supercritical $CO_2$. The behaviors of metal fluorinated diethyldithiocarbamate (FDDC) complexes in supercritical fluid chromatography (SFC) have not previously been reported. This example illustrates the separation of arsenic DDC and FDDC complexes in SFC using $CO_2$ as a mobile phase.

A Lee Scientific Model 602 supercritical fluid chromatograph with a Neslab RTE-100 constant temperature bath was used for all analysis reported in this example. This system was equipped with a timed-split rotary injection valve and an FID. All chromatograms were run using supercritical $CO_2$ as the mobile phase (Matheson) and a 5-meter 100-um ID by 195-um OD SB-Methyl-100 Superbond capillary column (Lee Scientific). The chromatographic signals were recorded and processed using a HP 3390A integrator. The temperature and density conditions for the analysis were computer controlled and are reported below.

The stock solutions (Zn, Ni, Co, Fe, Hg, As, Sb, and Bi) used in this study were Baker Analyzed Reagents from the J. T. Baker Chemical Company. Sodium diethyldithiocarbamate (NaDDC) was purchased from the Fisher Scientific Company. Other chemicals such as chloroform and dichloromethane were purchased from EM Science. Ammonium acetate buffer was prepared by mixing 120 g of glacial acetic acid (J. T. Baker Ultrapure Reagent) and 134 g of concentrated $NH_4OH$ (Aldrich A.C.S. Reagent) and diluting to 1 liter. The pH value was adjusted by dropwise addition of $HNO_3$ and/or $NH_4OH$. Deionized water was prepared by passing distilled water through an ion exchange column (Barnstead ultrapure water purification cartridge) and a 0.2-um filter assembly (Pall Corp, Ultipor DFA). Sodium bis(trifluoroethyl)amine was purchased from PCR Research Chemicals.

The metal-DDC and FDDC complexes were prepared by adding an excess amount of ligand to the metal solutions at the pH indicated in Anal. Chem 54:2536 (1982). The resulting precipitates were extracted into chloroform, and the organic phase was washed with deionized water after phase separation. Purification of the metal complexes was done using recrystallization from a chloroform/ethanol solution (1:1 v/v). Other chemicals used in the synthesis, including sodium amide, carbon disulfide, and potassium hydroxide were all obtained from Aldrich Chemical Company. All containers used in the experiments were acid washed, rinsed several times with deionized water, and dried in a class 100 clean hood.

The conditions used for chromatographic separation were an oven temperature of 100° C. with initial $CO_2$ pressure of 100 atm, followed by a 6.50 min hold time with a pressure ramp of 4.0 atm/min to a final pressure of 200 atm. Sample injection time was 0.1 seconds, which amounts to a calibrated 80 nL sample injection. Flame ionization detector (FID) temperature was 325° C. Under these conditions, separation and detection of some metal dithiocarbamate complexes such as $As(DDC)_3$, $Ni(DDC)_2$, $Pb(DDC)_2$, and $Zn(DDC)_2$ were possible. However, judging from the uneven reproducibility of results and broad peak shapes, these particular metal complexes apparently have a lower solubility in supercritical $CO_2$. These difficulties were further compounded by sample decomposition and retention within the column resulting in chromatographic memory and subsequent column contamination.

Figure 3:
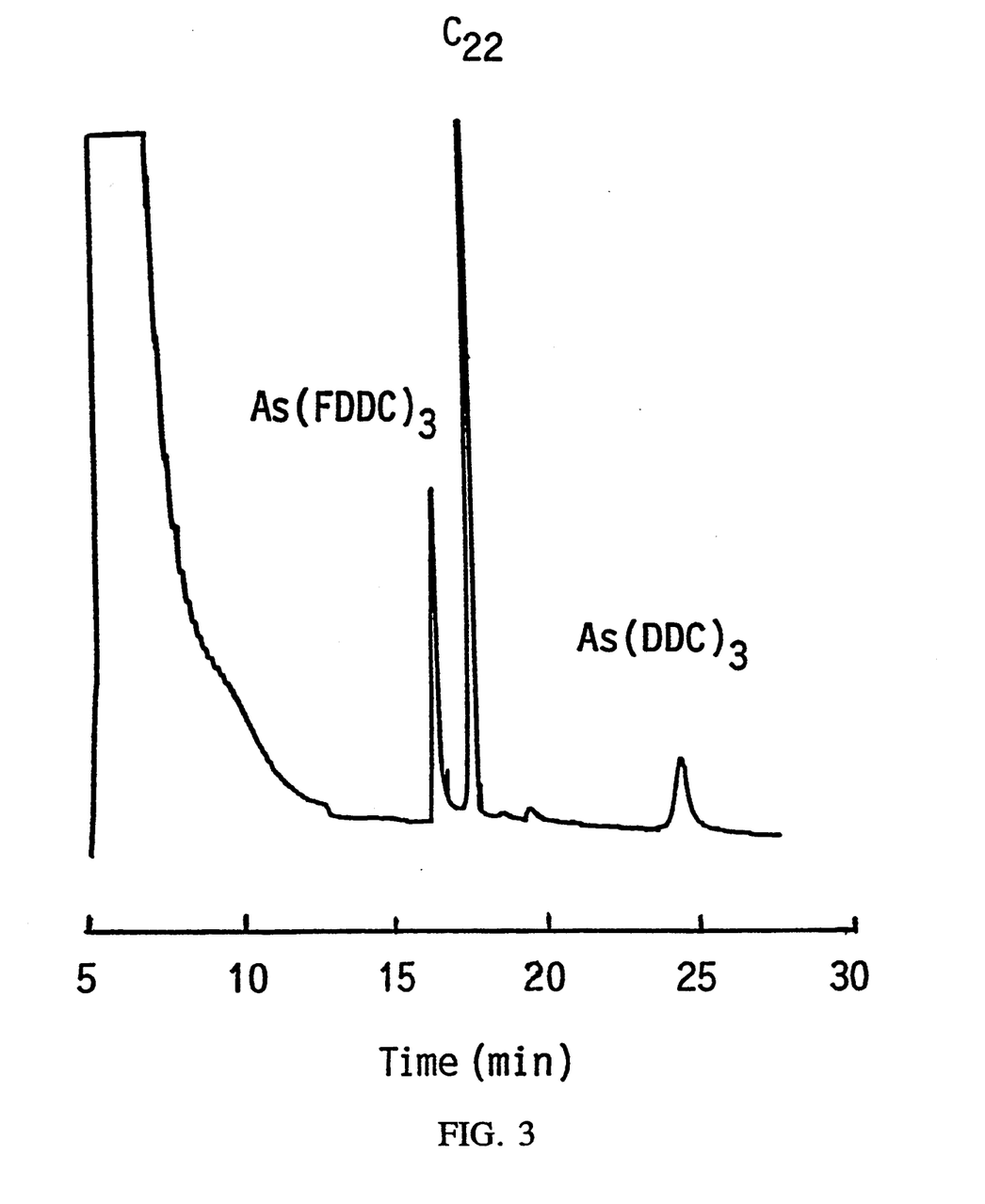
FIG. 3 is a chromatogram produced using a superbond capillary column injected at 100° C. oven temperature with a hold time of 6.5 minutes at 100 atm followed by a 4.0 atm/minute ramp.

Fluorination of the ligand changes the chromatographic behavior of these metal chelates. FIG. 3 illustrates this point with a comparison of a sample analyzed by capillary SFC containing the same concentration ($6 \times 10^{-4}$M) of $As(FDDC)_3$ and $As(DDC)_3$ with docasane ($C_{22}H_{46}$) being used in this case as an internal standard. The $As(DDC)_3$ peak is typical of metal-DDC complexes, being broader and less reproducible. On the other hand, the $As(FDDC)_3$ peak is sharp and well-defined, with a shorter retention time relative to the corresponding DDC complex. The chromatographic results of $As(FDDC)_3$ were reproducible without any of the column contamination problems that were encountered using DDC.

Figure 4:
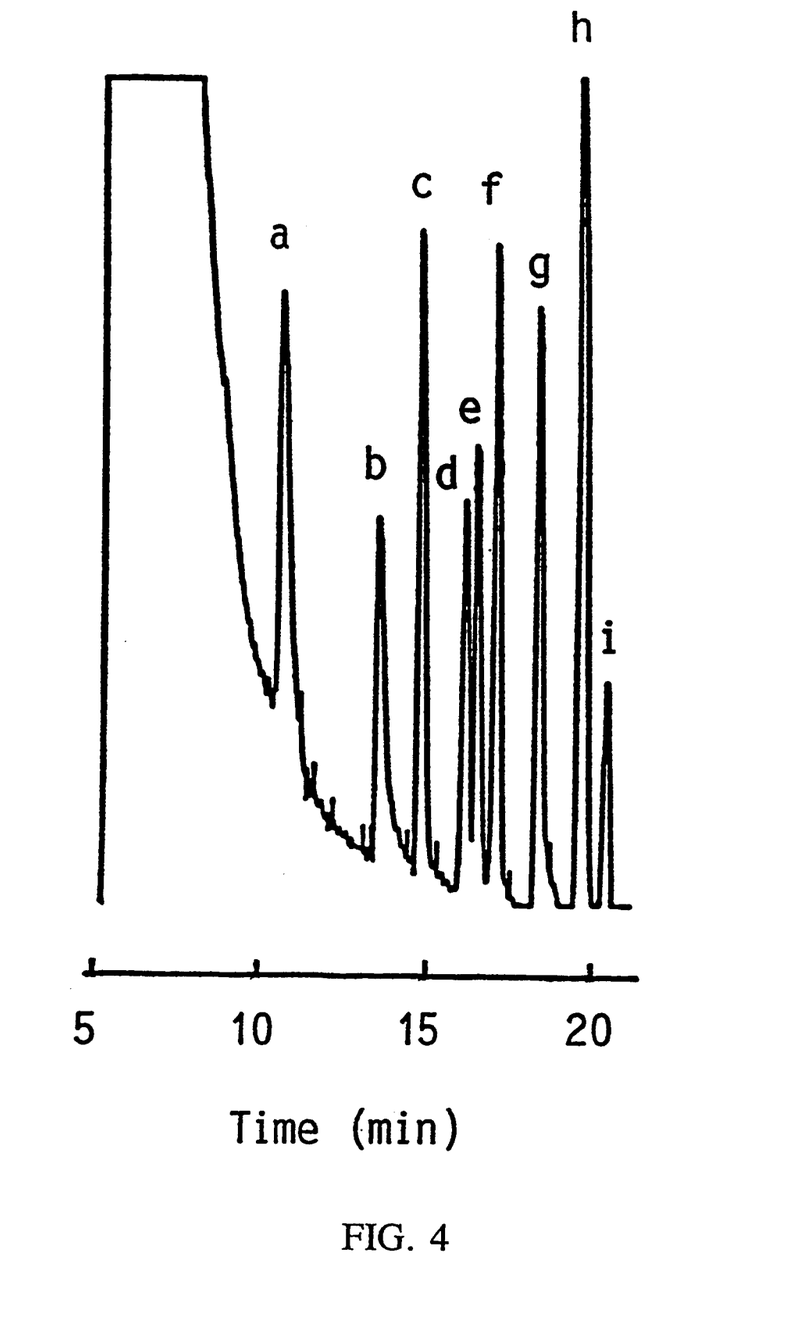
FIG. 4 is a chromatogram as in FIG. 3 showing peaks for (a) NaFDDC, (b) Zn(FDDC)$_2$, (c) Ni(FDDC)$_2$, (d) Co(FDDC)$_3$, (e) Fe(FDDC)$_3$, (f) Hg(FDDC)$_2$, (g) As(FDDC)$_3$, (h) Sb(FDDC)$_3$, (i) Bi(FDDC)$_3$.

FIG. 4 shows a series of metal-FDDC complexes that were separated and detected, which includes Zn, Ni, Co, Fe, Hg, As, Sb, and Bi. Peak (a) is NaFDDC, peak (b) is $Zn(FDDC)_2$, peak (c) is $Ni(FDDC)_2$, peak (d) is $Co(FDDC)_3$ peak (e) is $Fe(FDDC)_3$, peak (f) is $Hg(FDDC)_2$, peak (g) is $As(FDDC)_3$, peak (h) is $Sb(FDDC)_3$, and peak (i) is $Bi(FDDC)_3$. The valence of the metal ionic species is the same as the number of FDDC ligands in the chelate. This chromatograph shows the ability of the present method to separate and detect arsenic from a mixture of metal complexes. The detection limit of these metal chelates is generally in the order of 1 ppm. The extraction procedure serves as a preconcentration step for SFC analysis. With a preconcentration factor of 10 to 100, this technique can be used for trace analysis. The percentages of recovery of these trace metals using FDDC extraction are generally <95%.

EXAMPLE IV

Calculation of Stability Constant

Fluorination of diethyldithiocarbamate has been shown to increase the stability of metal chelates. A numerical value for the enhancement of the stability constant of the arsenic complex was estimated using a competition experiment where $As^{3+}$ was added in a substoichiometric amount to a mixture of equal amounts of Na-DDC and Na-FDDC. In this experiment, the concentration of $As^{3+}$ in the aqueous phase was $2.1 \times 10^{-3}$M and the concentrations of each ligand were $2.1 \times 10^{-2}$M. After extraction, the organic phase was analyzed by supercritical fluid chromatography (SFC) to determine the relative amounts of $As(FDDC)_3$. The relative stability constants of the two arsenic chelates can be calculated from the following equilibrium relations:

$$As^{3+} + 3\ FDDC^- \rightarrow As(FDDC)_3 \quad (1)$$

$$As^{3+} + 3\ DDC^- \rightarrow As(DDC)_3 \quad (2)$$

$$K_1/K_2 = ([As(FDDC)_3]/[As(DDC)_3])([DDC^-]/[FDDC^-])^3 \quad (3)$$

Since $[DDC^-]/[FDDC^-]$ equals 1 and $K_2$ has been determined by the inventors ($7.1 \times 10^{23}$), from the relative concentrations of the two arsenic complexes, $K_1$ can be calculated from equation (3). The value of $K_1$ determined from this experiment is $2.1 \times 10^{24}$.

EXAMPLE V

In accordance with one aspect of the present invention, the chelating agent is fluorinated to improve the solubility of the metal chelate in the supercritical fluid and enhance metal extraction. The effect of fluorination on the solubility of several metal chelates is explored in this example.

The chelating agents in this example are DDC, FDDC, "H-crown", "F2-crown", and "F6-crown." The structural formulae of these agents are shown below:

DDC

FDDC

"H-crown"

"F2-crown"

"F6-crown"

"H-crown" refers to the non-fluorinated molecule, "F2-crown" has two added fluorine atoms, and "F6-crown" has six added fluorine atoms.

Table III shows increases in solubility at the lower pressure/densities of $CO_2$. The solvation power of $CO_2$ at the higher pressures/densities increases significantly such that it is much more like a regular liquid organic solvent at those pressures. At such high pressures, the solubility enhancement from fluorine diminishes. This is advantageous because the solubility increase from fluorination occurs at moderate, easily achievable conditions.

TABLE III

| Solubilities of Fluorinated (FDDC) and Non-Fluorinated (DDC) Metal Diethyldithiocarbamates in supercritical $CO_2$ at 100 atm and 50° C. | | |
|---|---|---|
| Metal Chelate | Solubility | Ratio (FDDC/DDC) |
| Na(FDDC) | $(4.7 \pm 0.3) \times 10^{-4}$ | 3.1 |
| NA(DDC) | $(1.5 \pm 0.1) \times 10^{-4}$ | |
| Cu(FDDC)$_2$ | $(9.1 \pm 0.3) \times 10^{-4}$ | 830 |
| Cu(DDC)$_2$ | $(1.1 \pm 0.2) \times 10^{-6}$ | |
| Ni(FDDC)$_2$ | $(7.2 \pm 1.0) \times 10^{-4}$ | 850 |
| Ni(DDC)$_2$ | $(8.5 \pm 1.0) \times 10^{-7}$ | |
| Co(FDDC)$_3$ | $(8.0 \pm 0.6) \times 10^{-4}$ | 330 |
| Co(DDC)$_3$ | $(2.4 \pm 0.4) \times 10^{-6}$ | |
| Bi(FDDC)$_3$ | $(<10^{-7})$ | |
| Bi(DDC)$_3$ | $(1.3 \pm 0.1) \times 10^{-6}$ | |
| BiFDDC)$_3$[a] | $(7.3 \pm 1.0) \times 10^{-4}$ | 81 |
| Bi(DDC)$_3$[a] | $(9.0 \pm 0.6) \times 10^{-6}$ | |

[a]Solubility calculated at 150 atm and 50° C., corresponding to a $CO_2$ density 0.66 g/cm$^3$.

Dithiocarbamate chelating agents are somewhat nonselective for the metal with which a chelate is formed. Fluorination of a dithiocarbamate chelating agent, however has a greater effect on increasing the solubility of transition metal chelates such as Cu, Ni, and Co than on alkali earth metals such as Na.

TABLE IV

Solubility comparison of the lariat crown ethers in supercritical $CO_2$ at 50° C. C

| Pressure/Density | Solubilities | | |
|---|---|---|---|
| | F-6 crown | F-2 crown | H crown |
| 100 atm/0.388 | $(3.0 \pm 0.2)10^{-5}[M]$ | $(7.9 \pm 0.5)10^{-6}[M]$ | $(7.6 \pm 0.7)10^{-6}[M]$ |
| 117 atm/0.528 | $(9.0 \pm 0.4)10^{-5}[M]$ | $(8.4 \pm 0.5)^{-5}[M]$ | $(2.2 \pm 0.2)10^{-5}[M]$ |
| 150 atm/0.662 | $(1.3 \pm 0.1)10^{-4}[M]$ | $(9.9 \pm 0.5)10^{-5}[M]$ | $(7.6 \pm 0.7)10^{-5}[M]$ |
| 200 atm/0.767 | $(1.6 \pm 0.1)10^{-4}[M]$ | $(1.2 \pm 0.1)10^{-4}[M]$ | $(1.2 \pm 0.1)10^{-4}[M]$ |
| 250 atm/0.833 | $(1.8 \pm 0.1)10^{-4}[M]$ | $(1.5 \pm 0.1)10^{-4}[M]$ | $(1.8 \pm 0.2)10^{-4}[M]$ |
| 300 atm/0.883 | $(2.1 \pm 0.1)10^{-4}[M]$ | $(2.1 \pm 0.1)10^{-4}[M]$ | $(2.1 \pm 0.2)10^{-4}[M]$ |
| 350 atm/0.922 | $(2.4 \pm 0.2)10^{-4}[M]$ | $(2.3 \pm 0.1)10^{-4}[M]$ | $(2.7 \pm 0.3)10^{-4}[M]$ |
| 400 atm/0.955 | $(2.9 \pm 0.2)10^{-4}[M]$ | $(2.5 \pm 0.2)10^{-4}[M]$ | $(3.3 \pm 0.3)10^{-4}[M]$ |

% weight of Fluorine in Metal-FDDC Complexes is approximately 40%

Figure 5:
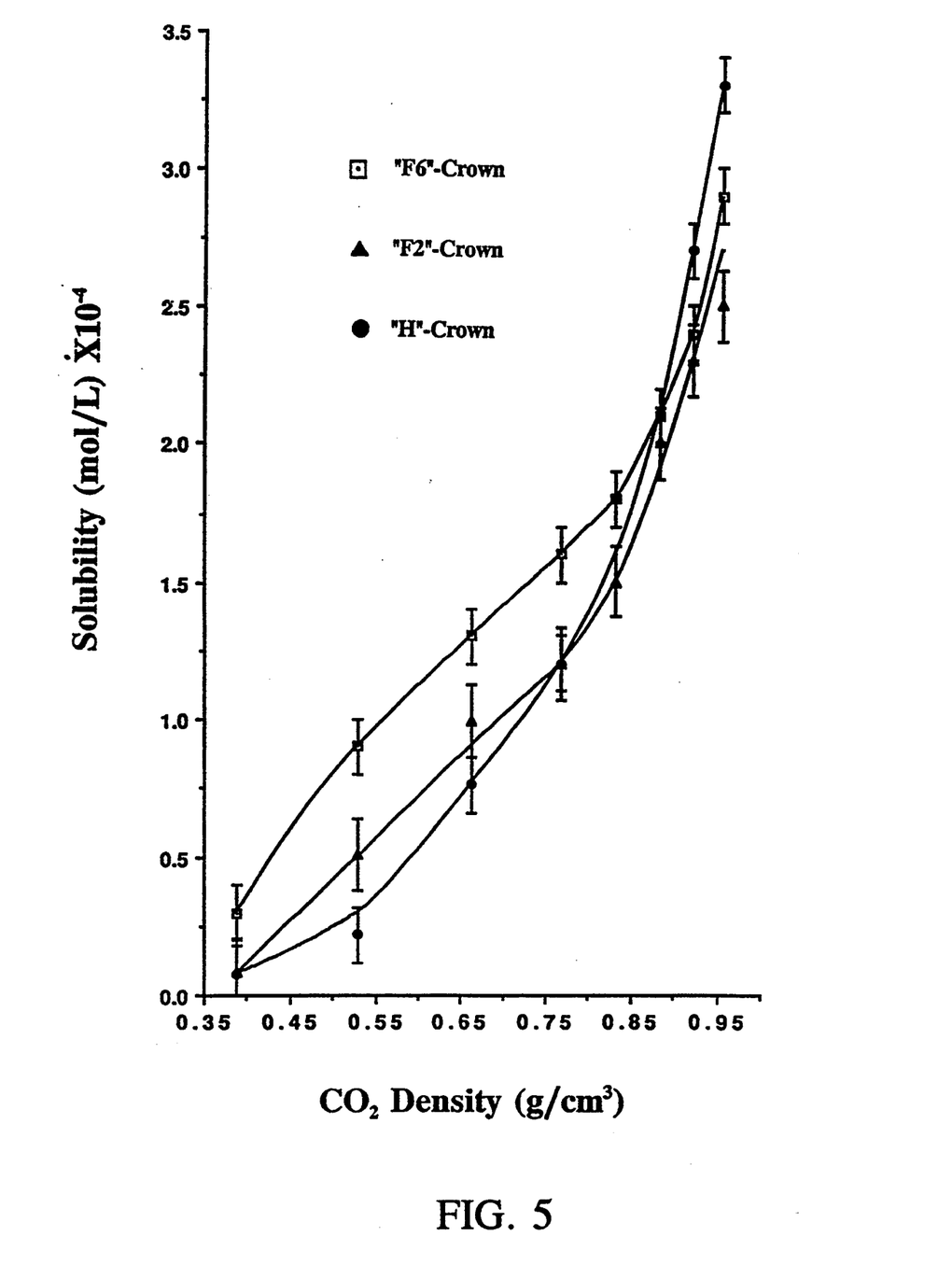
FIG. 5 is a graph comparing solubilities of an unfluorinated lariat crown ether with fluorinated lariat crown ethers.

These solubility characteristics are shown in FIG. 5.

EXAMPLE VI

Chelate Selectivity

The crown ethers are generally known as macrocyclic polyethers. Many related compounds have been made involving heterocyclic rings containing 12 to 60 atoms. Crown ethers are particularly useful as chelating agents because they can be made selective for particular ligands. There are, for example, optimum polyether ring sizes for different alkali metal cations. A 15 to 18 member ring has an optimal cavity size for chelating a cation having the radius of sodium; an 18 member ring is optimal for chelating potassium; and an 18 to 21 member ring is most suitable for cesium.

Functional groups on the crown ether also play a role in complexing cations. Some crown ethers with pendant carboxylate functional groups (such as symdibenzo-16-crown-5-oxyancetic acid) are quite efficient and selective for extracting trivalent lanthanide ions. The negatively charged carboxylate group is believed to attract the positively charged lanthanide ions, which are then inserted into a ring having the appropriate cavity size. For lanthanides and actinides, the cavity size is preferably a 16 member crown ether ring. The extraction does not require specific counter anions and is reversible with respect to pH. Lanthanides complexed with the lariat crown ether in an organic solvent can be stripped with a dilute acid to regenerate the chelating agent.

Spectroscopic evidence indicates that both the crown cavity and carboxylate group are involved in the complexation with a lanthanide to ligand ratio of 1:2, suggesting a possible sandwich formation. Experimental results also show that the efficiency of extraction of trivalent lanthanide ions is much greater ($>10^2$) than that of alkali metal ions such as $Na^+$, although the ionic radius of $Na^+$ (0.96 Å) is similar to those of the lanthanide ions (1.15 Å for $La^{+3}$). The reduced efficiency for $Na^+$ has been attributed to the high degree of ionization of $Na^+$ with the carboxylate group of the macrocycle. The crown ether carboxylic acid also shows lower extraction efficiencies for the alkaline earth metal ions ($Ca^{2+}$, $Sr^{2+}$, and $Ba^{2+}$) Thus, the functionalized macrocycles apparently act as bifunctional chelating agents which, with proper design, can be made more selective than the conventional neutral crown ethers.

The lariat crown ether system also shows high extraction efficiency for $Lu^{3+}$ (ionic radius 0.93 Å), and even has a selectivity for $Lu^{3+}$ over $La^{3+}$ by as much as an order of magnitude depending on the solvent. The observed selectivity is believed to result from small differences in ionic radius and bonding of the lanthanides with the ligand. Using this type of crown ether carboxylic acid, extraction of uranium and rare earth elements in seawater (with concentrations in the order of parts per billion or less) can be achieved quantitatively.

EXAMPLE VII

Hydroxamic Acid Crown Ethers

The crown ethers of the present invention include many hydroxamic acids that are described by the following empirical formula:

wherein n is an integer of from 0 to 6, X is a dibenzo crown ether of the formula dibenzo-[13+3m]-crown-[4+m]-ether wherein m is an integer of from 0 to about 5 or so and $R_8$ is a lipophilic group which imparts lipophilicity to the hydroxamic acid derivative. The size of the dibenzo crown ether may be varied provided the metal to be extracted fits in the ring such that the donor atoms coordinate to the metal (or to water associated with the metal). However, crown ethers in which the ring size of the crown is too large for a satisfactory host/guest interaction are not suitable. Some preferred dibenzo crown ethers are those in which m is 0, 1 or 2, and are, respectively, dibenzo-13-crown-4 ether, dibenzo-16-crown-5 ether, and dibenzo-19-crown-6 ether.

Since the chelating agents of the present invention are useful for the extraction of metal ions of the lanthanide and actinide series and of yttrium and scandium from aqueous medium, the hydroxamic acid derivatives of this invention are preferably lipophilic in order to minimize or even prevent the chelating agent from partitioning in the aqueous phase. Generally, the greater the lipophilicity of the chelating agent, the better the chelating agent will perform. Although R may be hydrogen, it is preferably a lipophilic moiety. Thus, R is preferably a hydrocarbyl group having from 1 to about 18 carbon atoms and is selected from the group consisting of alkyl, cycloalkyl, alkenyl and aryl groups. These groups may also be substituted with other functional groups. For example, if aryl is phenyl, the phenyl may be substituted with electron withdrawing groups such as fluorine, or it may be substituted with electron donating groups such as methoxy. By way of illustration and not in limitation, the phenyl group may be completely substituted with fluorine, such that R is $C_6F_5$ or it may be a 3,5-di-trifluoromethyl phenyl group.

Fluorinated derivatives of hydroxamic acid are believed to be useful in the extraction of lanthanide and actinide metal ions from supercritical carbon dioxide. The solubilities of hydroxamic acid chelates is relatively low in supercritical $CO_2$. Hence, side chain lipophilicity and fluorination are preferred to increase solubility of the chelate in supercritical $CO_2$.

It is believed that R groups of from about 6 to about 10 carbon atoms will sufficiently increase lipophilicity and maximize solubility of the chelate in supercritical $CO_2$. It is also believed that higher extraction efficiency is achieved with R groups of greater lipophilicity, that is, where R is a longer chain hydrocarbon, and that hydroxamic acids in which the R group is aryl are often more selective. The lipophilicity of the side chain should be less important for a more polar supercritical fluid such as $N_2O$.

In another aspect, the dibenzo ether derivatives of hydroxamic acid of the present invention are described by the following empirical formula:

(II)

wherein Y is a member selected from the group consisting of $(CH_2)_3$, $[[CH_2CH_2O]_nCH_2CH_2]$ wherein n is an integer of from 1 to about 4, and $CH_2CONHCH_2CH_2NHCOCH_2$; and $R_9$ and $R_{10}$ which may be the same or different, and is selected from the group consisting of H, and a hydrocarbyl group having from 1 to about 18 carbon atoms which is selected from the group consisting of alkyl, cycloalkyl, alkenyl and aryl groups. As with the hydroxamic acid derivatives represented by formula (I), the R groups are preferably lipophilic when the supercritical fluid is $CO_2$. Further, as with the hydroxamic acid derivatives represented by formula (I) above, these groups may be substituted with other functional groups. Fluorination of these groups would also be preferred when the supercritical fluid is relatively non-polar (such as supercritical carbon dioxide).

In yet another aspect, the present invention provides a bis-dibenzo crown ether derivative of a hydroxamic acid represented by the following empirical formula:

(III)

wherein X is a dibenzo crown ether of the formula dibenzo-[13+3m]-crown-[4+m]-ether and m is an integer of from 0 to about 5 or so, and $R_{11}$ is hydrogen or a lipophilic hydrocarbyl group having from 1 to about 18 carbon atoms and is selected from the group consisting of alkyl, cycloalkyl, alkenyl and aryl groups. The R groups may be substituted with other functional groups, preferably fluorine. The dibenzo crown ether X may be the same or different and its size may be varied provided the metal to be extracted fits into the ring to permit chelation. The preferred dibenzo crown ethers are those in which m is 0, 1 or 2, and are, respectively, dibenzo-13-crown-4 ether, dibenzo-16-crown-5 ether and dibenzo-19-crown-6 ether. Fluorination of the benzene rings is especially preferred when the crown ether is to be used with a relatively nonpolar supercritical fluid such as $CO_2$.

The present invention further provides a tridentate derivative of a hydroxamic acid represented by the formula:

(IV)

where $R_{12}$ or $R_{13}$ may be H, but preferably $R_{12}$ or $R_{13}$ is a lipophilic moiety having of from 1 to about 18 carbon atoms and is selected from the group consisting of alkyl, cycloalkyl, alkenyl and aryl groups. The $R_{12}$, $R_{13}$ groups may be the same or different moieties, and may be substituted with other functional groups, such as fluorines.

Details of the synthesis of specific crown ethers useful in this invention are set forth in co-pending U.S. patent application Ser. No. 07/714,265, filed Jun. 12, 1991, which has been incorporated by reference.

EXAMPLE VII

Waste Treatment Process

Figure 6:
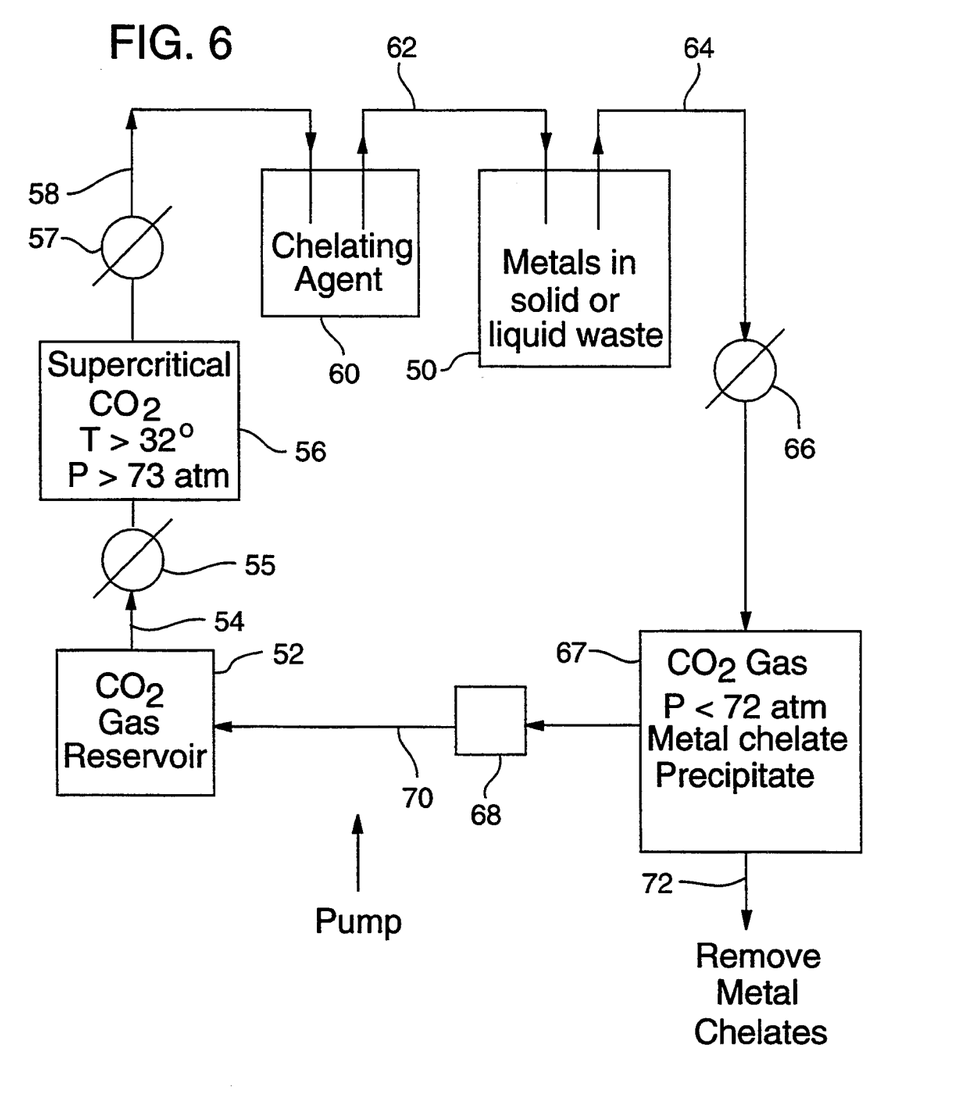
FIG. 6 is a schematic drawing of a waste treatment system in accordance with the present invention.

One proposed embodiment for a continuous selective-chelation supercritical fluid extraction process is illustrated in FIG. 6. This process is suitable for chelating metals that are contained in solid or liquid waste held in a container 50. A supercritical fluid, such as carbon dioxide gas, is supplied from a $CO_2$ gas reservoir 52 which is connected by a conduit 54 containing a valve 55 to a pressurization unit 56 that increases the pressure on the gas to greater than 73 atmospheres at a temperature greater than 32° C. to form supercritical carbon dioxide. The supercritical $CO_2$ then travels through a valve 57 and conduit 58 to a reservoir 60 that holds a solid or liquid chelating agent, such as any of the agents described in the earlier Examples of this specification. The $CO_2$ is there passed through a column containing solid or liquid chelating reagent to extract the chelating agent into the supercritical fluid $CO_2$ stream. The supercritical fluid and chelating agent leave reservoir 60 through a conduit 62 and are introduced into container 50.

The supercritical fluid/chelating agent is intimately mixed with the solid or liquid waste in container 50 using either a batch or continuous process. In a batch process, simple mixing would occur through stirring or sonification. Alternatively, mixing could occur by allowing $CO_2$ to flow through a column of solid waste. In a continuous mixing embodiment, $CO_2$ would flow through a column of solid waste material. Continuous mixing with a liquid waste could be achieved with counter current flow.

After mixing, the metal chelate and $CO_2$ is removed through a conduit 64. A depressurizer valve 66 is present in line 64 to reduce the pressure to below seventy-two atmospheres such that the metal chelate precipitates in container 67. The $CO_2$ gas is then recycled by pump 68 through line 70 to gas reservoir 52. Metal chelates can be removed from the bottom of container 67 through line 72 such that the chelating agent can be regenerated from the metal chelate. When regeneration of the chelating agent is desired, metal ions can be stripped from the chelate using a nitric acid solution having a pH less than one.

The extraction system should be thermally controlled, either by known electrical means or immersion in a constant temperature bath. Thermal control allows the carbon dioxide or other supercritical fluid to be maintained above its supercritical temperature.

Having illustrated and described the principles of the invention in several preferred embodiments, it should be apparent to those skilled in the art that the invention can be modified in arrangement and detail without departing from such principles. We claim all modifications coming within the spirit and scope of the following claims.

We claim:

1. A method of extracting a metalloid or metal species from a solid or liquid, comprising the steps of:
   exposing the solid or liquid to a supercritical fluid solvent containing a fluorinated chelating agent, for a sufficient period of time to form chelates between the agent and species that are solubilized in the supercritical fluid solvent.

2. The method of claim 1 further comprising the step of separating the supercritical fluid from the solid or liquid after the chelate is solubilized in the supercritical fluid.

3. The method of claim 2 wherein the exposing step further comprises providing supercritical carbon dioxide as the supercritical fluid.

4. The method of claim 3 wherein the exposing step further comprises providing a fluorinated chelating agent in the solvent.

5. The method of claim 2 wherein the step of providing a fluorinated chelating agent comprises providing a chelating agent selected from the group consisting of an ionizable crown ether and a fluorinated dithiocarbamate.

6. The method of claim 5 wherein the step of providing an ionizable crown ether comprises providing a dibenzo crown ether derivative of a hydroxamic acid represented by the formula:

wherein X is a dibenzo crown ether of the formula dibenzo [13+3m]-crown-[4+m]ether, and m is an integer of from 0 to about 5, n is an integer from 0 to 6, and $R_1$ is H or a lipophilic hydrocarbyl group having from 1 to about 18 carbon atoms and is selected from the group consisting of alkyl, cycloalkyl, alkenyl and aryl groups.

7. The method of claim 6 wherein the supercritical fluid is carbon dioxide and $R_1$ is the lipophilic hydrocarbyl group.

8. The method of claim 7 wherein the crown ether is fluorinated.

9. The method of claim 5 wherein the step of providing an ionizable crown ether comprises providing a crown ether having the chemical formula:

wherein X=OH or NHOH; $R_2$=alkyl, fluorinated alkyl, phenyl or fluorinated phenyl; $R_3$=alkyl, fluorinated alkyl; $R_4$=H or F; and $R_5$=H or F.

10. The method of claim 5 wherein the step of providing a chelating agent comprises providing a dithiocarbamate.

11. The method of claim 10 wherein the providing step comprises providing a dithiocarbamate having the general formula:

wherein $R_6$ and $R_7$ are alkyl or aromatic groups containing one or more fluorine atoms.

12. The method of claim 11 wherein the providing step comprises providing a dithiocarbamate wherein $R_4=R_5=CF_3CH_2$.

13. The method of claim 1 wherein the exposing step further comprises providing a secondary modifying solvent.

14. The method of claim 13 wherein the modifying solvent is selected from the group consisting of medium boiling point alcohols and esters.

15. A metal chelate formed by the process of claim 1.

16. A method of extracting metalloid or metal species from a solid or liquid, comprising the step of:
   exposing the solid or liquid to supercritical carbon dioxide and a fluorinated chelating agent which forms chelates with the species that are soluble in the supercritical carbon dioxide.

17. The method of claim 16 wherein the exposing step comprises exposing the solid or liquid to a fluorinated chelating agent selected from the group consisting of dithiocarbamates and crown ethers.

18. The method of claim 16 wherein the exposing step comprises continuously flowing the supercritical carbon dioxide through the solid or liquid.

19. The method of claim 16 wherein the exposing step comprises non-continuously mixing the supercritical carbon dioxide with the solid or liquid.

20. The method according to claim 16 wherein the fluorinated chelating agent comprises a fluorinated dibenzo crown ether.

21. A method of extracting a metalloid or metal species from a solid or liquid, comprising the steps of:
exposing the solid or liquid to supercritical fluid carbon dioxide containing a fluorinated chelating agent for a sufficient period of time to form chelates between the agent and species that are solubilized in the supercritical carbon dioxide.

22. The method according to claim 21 wherein the solid or liquid comprises a waste material containing metal and metal waste species.

23. The method according to claim 22 and further comprising the steps of:
providing a container of the waste material;
exposing a supercritical fluid to the waste material in the container, the waste species being soluble in the supercritical fluid such that the supercritical fluid solubilizes the waste species; and
removing the supercritical fluid and solubilized waste species from the container.

24. The method according to claim 23 wherein the exposing step comprises passing a continuous stream of supercritical fluid through the container such that the supercritical fluid contacts the waste material and solubilizes the waste species.

25. The method of claim 24 wherein the exposing step further comprises providing a chelating agent in the supercritical fluid that forms chelates with the metalloid or metal species, wherein the chelates are soluble in the supercritical fluid.

26. The method according to claim 24 further comprising the step of reducing the temperature or pressure of the supercritical fluid to form a gas and precipitate the chelate.

27. The method according to claim 26 further comprising the step of recovering the metal from the chelate to regenerate the chelate.

28. The method according to claim 26 further comprising the step of increasing the temperature or pressure of the gas after precipitating the chelate to reform the supercritical fluid, and recycling the supercritical fluid to expose it to the waste material.

29. The method according to claim 23 further comprising the step of exposing the supercritical fluid to a chelating agent prior to exposing the supercritical fluid to the waste material, the chelating agent being soluble in the fluid such that the chelating agent is solubilized in the fluid and forms chelates with the species that are soluble in the fluid.

30. The method according to 23 wherein the step of exposing the waste material to the supercritical fluid comprises exposing the material to supercritical carbon dioxide.

31. The method according to 30 further comprising the step of providing a chelating agent in the supercritical fluid that forms chelates with the metalloid, metal, lanthanide or actinide species, wherein the chelates are soluble in supercritical carbon dioxide.

32. The method according to claim 31 wherein the step of providing a chelating agent comprises providing a dithiocarbamate or crown either chelating agent.

* * * * *